United States Patent [19]

Schauer

[11] Patent Number: 5,032,084
[45] Date of Patent: Jul. 16, 1991

[54] APPARATUS FOR PROVIDING AN ELECTRICAL CONDUCTION PATH BETWEEN TWO CONTACT LOCATIONS WHICH ARE ROTATABLE WITH RESPECT TO EACH OTHER

[75] Inventor: Friedrich Schauer, Heroldsberg, Fed. Rep. of Germany

[73] Assignee: Kabelmetal Electro GmbH, Hanover, Fed. Rep. of Germany

[21] Appl. No.: 619,385
[22] Filed: Nov. 29, 1990

[30] Foreign Application Priority Data

Dec. 7, 1989 [DE] Fed. Rep. of Germany ... 8914384[U]

[51] Int. Cl.$^5$ .......................................... H01R 35/04
[52] U.S. Cl. ...................................... 439/15; 439/164
[58] Field of Search .................. 439/13, 15, 164, 496, 439/495

[56] References Cited

U.S. PATENT DOCUMENTS

| | | | |
|---|---|---|---|
| 4,836,795 | 6/1989 | Schauer | 439/164 |
| 4,927,365 | 5/1990 | Schauer et al. | 439/15 |
| 4,943,240 | 7/1990 | Karlsson | 439/15 |
| 4,969,523 | 9/1987 | Schauer et al. | 439/11 |

FOREIGN PATENT DOCUMENTS 2513635 10/1975 Fed. Rep. of Germany ...... 439/496
53-124793 10/1978 Japan .................................. 439/495

Primary Examiner—Gary F. Paumen
Attorney, Agent, or Firm—James C. Jangarathis

[57] ABSTRACT

There is described an apparatus comprising a flat ribbon cable including a plurality of electrical conductors connected between two contact locations rotatable one with respect to the other. At each end of the flat ribbon cable, there is provided a connection line including a plurality of connection conductors, and a connection assembly comprised of a receptacle assembly and a plug assembly. The receptacle assembly surrounds an end portion of the flat ribbon cable including uninsulated portions of the electrical conductors, while the plug assembly includes a plurality of spring contacts each attached to an end of one of the connection conductors. Upon insertion of the plug assembly into the receptacle assembly, the spring contacts compressively engage mechcially fixed, uninsulated portions of the electrical conductors, thus providing electrical contacts therebetween.

5 Claims, 2 Drawing Sheets

APPARATUS FOR PROVIDING AN ELECTRICAL CONDUCTION PATH BETWEEN TWO CONTACT LOCATIONS WHICH ARE ROTATABLE WITH RESPECT TO EACH OTHER

The invention relates to an apparatus for maintaining an electrical conduction path between two contact locations rotatable with respect to each other; and, more particularly, to such an apparatus comprising a flat ribbon cable wound as a coiled spring, and having ends thereof firmly attached to such contact locations by way of connection lines.

BACKGROUND OF THE INVENTION

It is priorly known to provide a conduction path between two contact locations of which one is movable on a circular path, while the other is disposed stationary outside such circular path. Apparatus having such conductor paths include, for instance, cable coilers in which the electric cable or cord is wound on a reel. The cord can be pulled out of the housing of the apparatus. Under the action of a spring it is automatically rolled up again after a pulling force is removed. One essential problem here is the transfer of current from the stationary firm attachment of the apparatus to the end of the line which is arranged turnably on the spool. For the transfer of current between contact locations which move relative to each other, wiper contacts or rings are priorly known. Such arrangements are subject to wear and are at a disadvantage in the case of low current intensities because of high transfer resistances.

U.S. Pat. No. 4,696,523, issued Sept. 29, 1987, is directed to a priorly known apparatus including a conduction path between two contact locations which are rotatable with respect to each other. In this apparatus, the conduction path is comprised of a flat ribbon cable wound in the manner of a coiled spring. Upon the rotation of one of the contact locations in one direction, the windings of such coiled spring are pulled together to reduce the diameter of the coiled spring, while rotation in the opposite direction causes the windings of such coil springs to expand and increase the diameter of the coiled spring. Accordingly, the relative movement of the two contact locations connected by such coiled spring results in a "breathing motion", similar to a watch spring. To protect against the considerable mechanical stress and kinking of the end portions of the flat ribbon cable firmly attached to the corresponding contact locations, such prior art apparatus include strip-shaped stabilizers at each of the connections between the flat ribbon cable and the contact locations, each of such stabilizers being of dimensionally stable plastic and having a U-shaped cross section for closely enclosing the associated end portion of the flat ribbon cable.

U.S. Pat. No. 4,836,795, issued June 6, 1989, is directed to a priorly known apparatus for providing an electrical conduction path between a first contact location rotatable a plurality of rotations, in either direction, about a longitudinal axis, and a stationary contact location positioned radially from the rotatable contact location. Such apparatus is comprised of a bifilar spiral spring formed of a length of flat ribbon cable having at least two electrical conductors. The bifilar spiral coil spring is secured only by firmly attached connections at its opposite ends to the two contact locations; whereby it uncoils and slidably moves in response to the direction of rotation of the rotatable contact location, and upon reversal of such rotation, recovers its original shape and position between the two contact locations.

U.S. Pat. No. 4,927,365, issued May 22, 1990, is directed to a priorly known apparatus comprising an electrical conduction path between two contact locations rotatable, one with respect to the other. The electrical conduction path comprises a flat ribbon cable, including at least two electrical conductors, that is wound in the manner of a coiled spring. The flat ribbon cable is firmly attached at a first end thereof to one of the contact locations, while the other end thereof is firmly attached to the other contact location. To protect the flat ribbon cable from kinking and mechanical damage at each of the ends thereof, each end portion thereof is folded across an immediately adjacent portion and a stabilizer connection assembly is positioned to extend across both such portions.

With all such prior art apparatus the connected ends of the flat ribbon cable are subject to damage due to high tension and bending stresses. Additionally, since such cables often comprise a plurality of electrical conductors of minimal, flat cross-sections, their ability to withstand such high tension and bending stresses is quite limited.

OBJECTS OF THE INVENTION

An object of the present invention is to provide a novel apparatus for maintaining a conductive path between two contact locations rotatable with respect to each other, such conductive path comprising a flat ribbon cable at least one end of which is connected to a connection line that is firmly attached to one of said contact locations. Another object of the present invention is to provide such a novel apparatus in which the end portions of the flat ribbon cable in the vicinity of the respective contact locations are protected against mechanical damage and kinking.

SUMMARY OF THE INVENTION

These and other objects of the present invention are achieved by an apparatus comprising a flat ribbon cable including a plurality of electrical conductors connected between two contact locations rotatable one with respect to the other. At each end of the flat ribbon cable, there is provided a connection line including a plurality of connection conductors, and a connection assembly comprised of a receptacle assembly and a plug assembly. The receptacle assembly surrounds an end portion of the flat ribbon cable including uninsulated portions of the electrical conductors, while the plug assembly includes a plurality of spring contacts each attached to an end of one of the connection conductors. Upon insertion of the plug assembly into the receptacle assembly, the spring contacts compressively engage the uninsulated portions of the electrical conductors, thus providing electrical contacts therebetween.

BRIEF DESCRIPTION OF THE DRAWINGS

A better understanding of the present invention as well as the objects and advantages thereof will become apparent upon consideration of the following disclosure thereof, especially when taken with the accompanying drawings, wherein:

Referring to FIG. 1, there is depicted two circular walls 1 and 2 of a housing of an electric apparatus. This apparatus may function as a control apparatus for antirebound protection when installed in the steering shaft of an automobile. In order to provide an electric signal to an electronic system 3 of this apparatus, the apparatus is connected to a battery 4. The battery 4 is connected via an electric cable 5 to a fixed contact location 6. The electronic system 3 is connected by an electric line 7 to a contact location 8 which is rotatable in the direction indicated by a double-ended arrow 9. Between the two contact locations 6 and 8 there is a coiled spring formed of a length of flat ribbon cable 10 of a priorly known type positioned about the rotatable contact location 8. Upon rotation of the rotatable contact location 8 in one direction, the windings of the flat ribbon cable 10 are pulled together to reduce the diameter of the coiled spring; while the rotation in the opposite direction causes the windings of the coiled spring to expand and increase in diameter. Accordingly, the relative movement between the two contact locations 6 and 8 connected, in the main, by the flat ribbon cable 10 results in a "breathing motion". Although the number of revolutions of a steering wheel of an automobile is limited to about six revolutions, the length of the flat ribbon cable 10 is such as to provide substantially more than six windings between the contact locations 6 and 8. Thus, a single revolution of the contact location 8 is not substantially perceptible. Each end of the flat ribbon cable 10 is connected by means of a connection assembly 17 and a connection line 20 to one of the contact locations 6 or 8. Each connection assembly 17 and associated connection line 20, features of which are described hereafter with respect to FIGS. 3 through 8, are connected to the corresponding contact location 6 or 8, for example, by welding or bonding, or by a clamp or snap engagement.

Referring to FIG. 2, there is depicted an apparatus for maintaining a conduction path between a contact location 8' rotatable about the longitudinal axis of a steering column of an automobile, and a fixed contact location 6' radially positioned from the rotatable contact location 8'. Such apparatus includes a bifilar spiral coil spring 12' formed of a length of flat ribbon cable 10', including a plurality of electrical conductors. In particular, the flat ribbon cable 10' is configured so as to have one portion thereof bent over, at a reversing location 13', onto the remaining portion thereof, and thereafter being formed as the bifilar spiral coil spring 12' with the reversing location 13' as its center. Each of the ends of the flat ribbon cable 10' is connected to one of the contact locations 6' or 8' by way of a connection assembly 17' and a connection line 20' of the same type referred to above with respect to FIG. 1. Each of the two portions of the flat ribbon cable 10' divided at the reversing location 13', is of a length sufficiently greater than the distance between the stationary contact location 6' and the rotatable contact location 8' such that the bifilar spiral coil spring 12' has a diameter in its original shape and position at most identical with the shortest distance between the contact locations 6' and 8', and only partially uncoils upon a plurality of rotations of the contact location 8'. The bifilar spiral coil spring 12' is secured only by the connection assemblies 17' and connection lines 20' at its opposite ends to the two contact locations 6' and 8', whereby it uncoils and slidably moves in response to the direction of rotation of the rotatable contact location 8', and upon reversal of such rotation, recovers its original shape and position between the two contact locations 6' and 8'.

Figure 1:
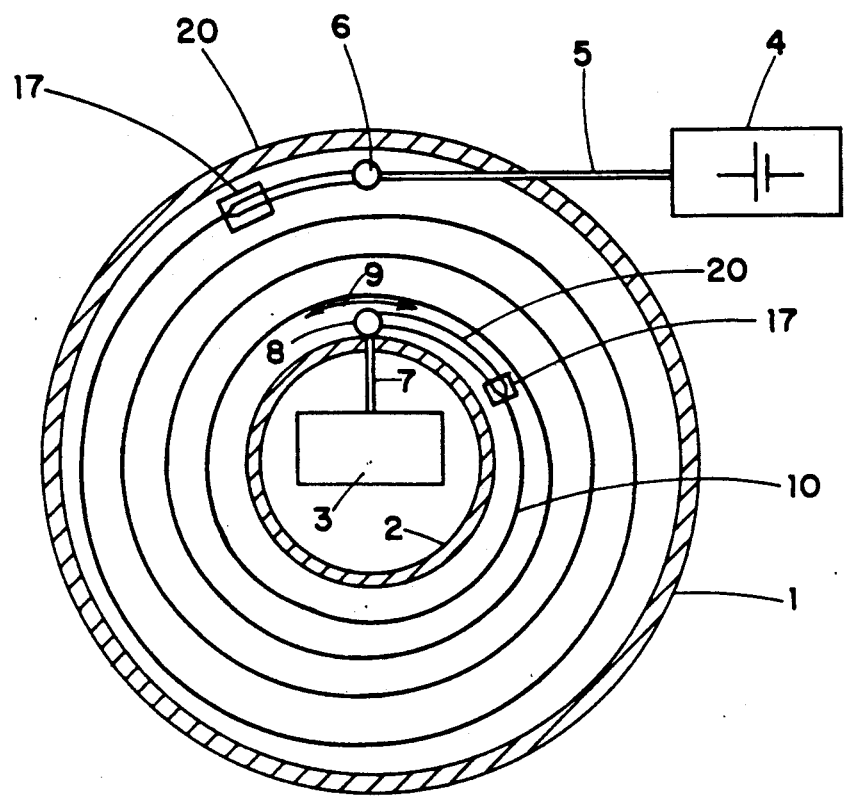
FIG. 1 is a schematic view of a first apparatus in accordance with the invention for maintaining an electrical conduction path between two contact locations one of which is rotatable with respect to the other, the conduction path comprising a length of flat ribbon cable formed as a coiled spring having its turns lying concentric to each other, and a connection line connected, by way of a connection assembly, between each end of the flat ribbon cable and one of the contact locations
Figure 2:
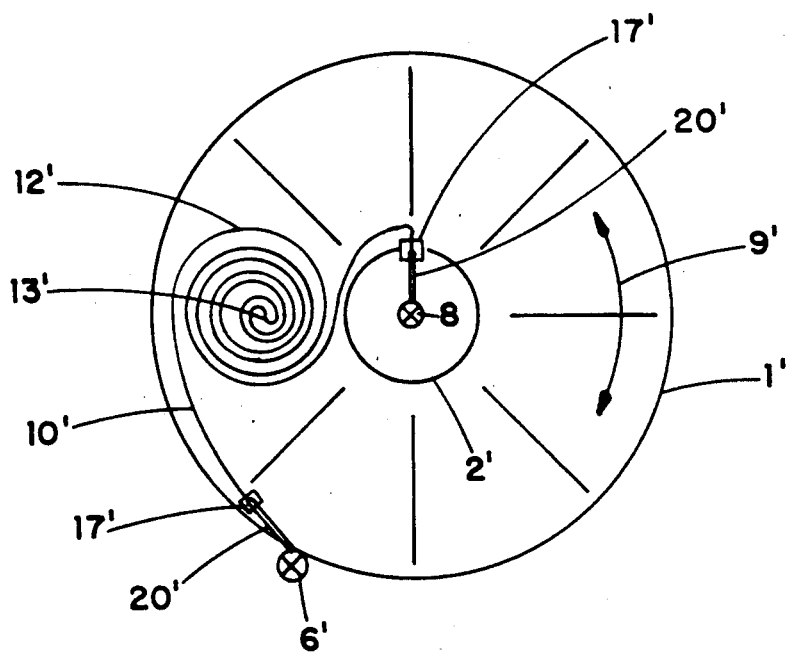
FIG. 2 is a schematic view of a second apparatus in accordance with the invention for maintaining an electrical conduction path between two contact locations one of which is rotatable with respect to the other, such conduction path comprising a length of flat ribbon cable formed as a bifilar spiral coil spring, and a connection line connected, by way of a connection assembly, between each end of the flat ribbon cable and one of the contact locations.

As the connection assembly 17 and connection line 20 employed in the apparatus of FIG. 1, and the connection assembly 17' and connection line 20' employed in the apparatus of FIG. 2 are identical as to structure and the manner in which they are connected, respectively to the flat ribbon cable 10 and 10', only one such connection assembly and connection line shall be described hereafter.

Figure 3:
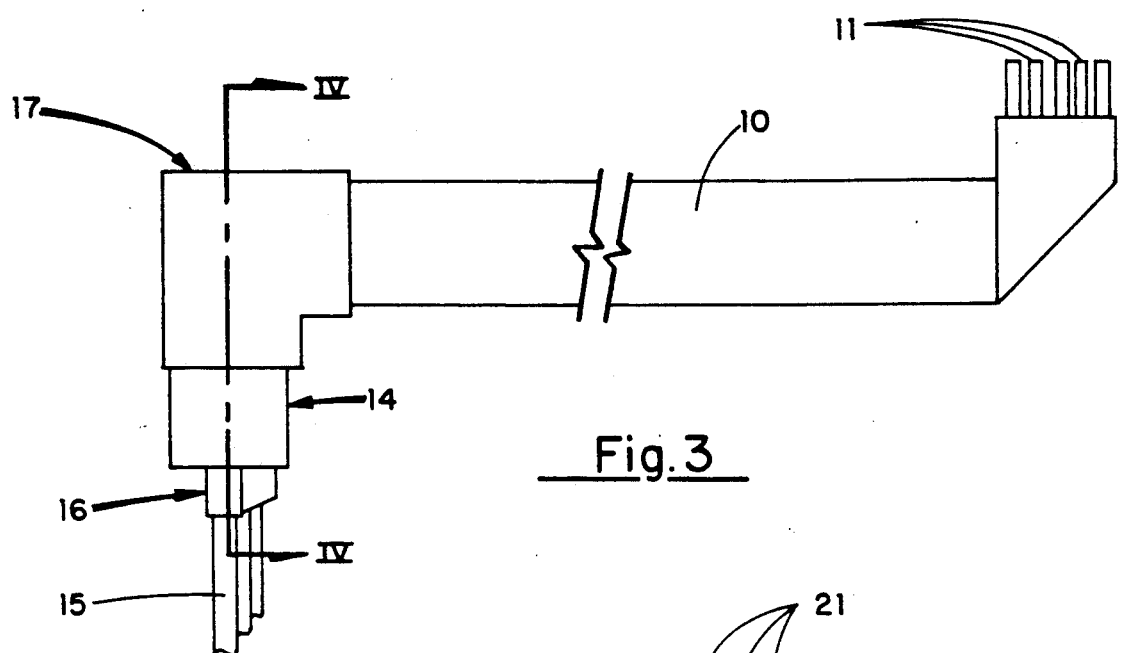
FIG. 3 is a plan view of a length of flat ribbon cable of a priorly known type employed in the apparatus of FIGS. 1 and 2, including a plurality of electrical conductors, such cable having an end portion which is folded across the immediately adjacent portion to form an end thereof that is serially connected to a connection line, by way of a connection assembly.
Figure 4:
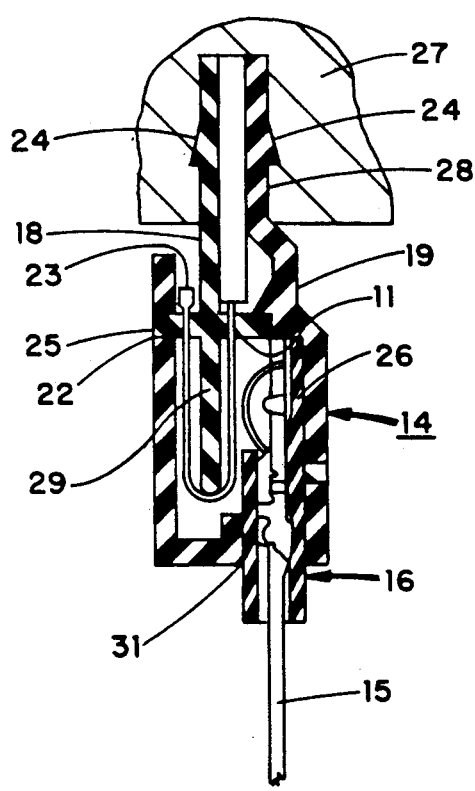
FIG. 4 is an enlarged, partial sectional view taken along IV—IV of FIG. 3.

FIG. 3 indicates the manner in which each end portion of the flat ribbon cable 10 is folded across an immediately adjacent portion of the flat ribbon cable 10 to form a change in the longitudinal direction of such cable of approximately 90 degrees. At one end of the flat ribbon cable 10 there is provided a connection assembly 17 that enables serial connections to be made between the plurality of electrical conductors 11 of the flat ribbon cable 10 and the plurality of connection conductors 15 of which the connection line 20 is comprised. The connection assembly 17 includes a receptacle assembly 14 and a plug assembly 16, the latter being insertable into a plug aperture 29 within the former to assume a fixed position therein.

With regard to FIGS. 4 through 7, the receptacle assembly 14 is comprised of a housing 27, and insertable parts 18 and 19 comprised of insulating material. The housing 27 includes an aperture 28 for the insertion of an end portion of the flat ribbon cable 10, an end portion of the insertable part 10 and an end portion of insertable part 19, so as to closely surround such end portion of the flat ribbon cable 10, while extending uninsulated portions of the electrical conductors 11 between the insertable parts 18 and 19.

Figure 5:
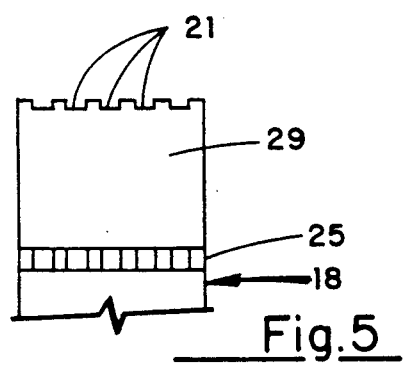
FIG. 5 is an enlarged plan view of an elongated support portion of an insertable part depicted in FIG. 4.
Figure 6:
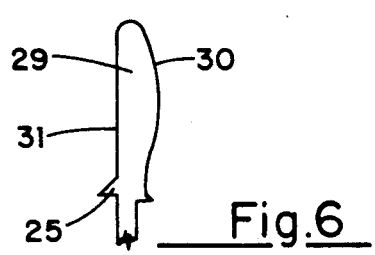
FIG. 6 is a side view of the elongated support portion of the insertable part depicted in FIG. 4.
Figure 7:
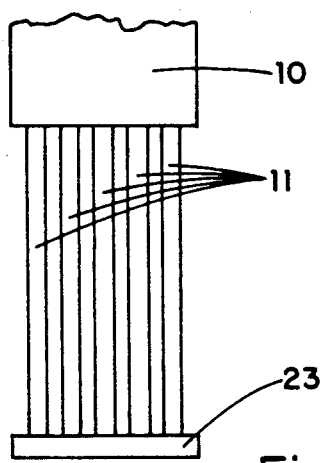
FIG. 7 is a plan view of an end portion of a flat ribbon cable from which the insulation has been removed from portions of the plurality of electrical conductors.

The procedure of forming the receptacle assembly 14 about the end portion of the flat ribbon cable 10 is as follows:

The end portions of the electrical conductors 11 of the flat ribbon cable 10 have the insulation removed therefrom (except for an insulation strip 23 at the very end of such cable - FIG. 7). With one end of the insertable part 18 locked in position within the aperture 28 of the housing 27, the uninsulated end portions of electrical conductors 11 are longitudinally extended about an elongated support portion 29 of the insertable part 18. The insertable part 19 is then axially positioned about the insertable part 18 and into the aperture 28, thus assuring that the uninsulated portions of the electrical conductors 11 extend around the elongated support portion 29. The insertable parts 18 and 19 each have key extension 24 for maintaining a locked position within the housing 27. Further, the insertable part 19 includes a recess 22 (FIG. 4) through which partially extend a plurality of alignment protrusions 25 on a back face 31 of the elongated support portion 29 for maintaining the insulation strip 23 at a point beyond the recess 22. A front face 30 of the elongated support portion 29 upon which the uninsulated electrical conductors first engage has preferably a convex configuration (FIG. 6). The elongated support portion 29 additionally includes a plurality of recesses 21 at an end thereof for maintaining a constant separation between the uninsulated portions of the electrical conductors 11 bent therearound (FIG. 5).

The plug assembly 16 includes a plurality of side by side, spring contacts 26 each attached to an end of one of the plurality of connection conductors 15 of the connection line 20. The axial axis of each of the spring contacts 26 are spaced from each other so as to conform to the separation between each of the uninsulated portions of the electrical conductors 11 positioned against the front face 30 of the elongated support portion 29.

To complete the assemblage of the connection assembly 17, the plug assembly 16 is inserted into the aperture 31 within the bottom face of the insertable part 19 of the receptacle assembly 14. Each of the spring contacts 26 engages an uninsulated portion of one of the electrical conductors 11 positioned against the front face 30 of the elongated support portion 29, thus providing electrical conduction paths between the plurality of electrical conductors 11 of the flat ribbon cable 10 and the plurality of connection conductors 15 of the connection line 20. The plug assembly 16 is so configured with respect to the aperture 31 that it is yieldingly locked in the receptacle assembly 14, while the resilience and spring path of each of the spring contacts 26 are such as to assure a firm, compressive engagement with the uninsulated portion of the adjacent electrical conductor 11 that is fixed against the front face 30 of the elongated support portion 29. Advantageously, the spring contacts 26 are of sufficient size and have spring paths that compensate for dimensional variations of the other components.

While the invention has been described in connection with exemplary embodiments thereof, it will be understood that many modifications will be apparent to those of ordinary skill in the art, and that this application is intended to cover any adaptation or variation thereof. Therefore, it is manifestly intended that the invention be only limited by the claims and equivalents thereof.

What is claimed:

1. In an apparatus for providing an electrical conductive path between a first contact location and a second contact location rotatable one with respect to the other, said electrical conductive path comprising a flat ribbon cable wound in the manner of a coiled spring and comprising a plurality of electrical conductors; the improvement comprising an end portion of said flat ribbon cable being connected by way of a connection assembly to one end of a connection line having a plurality of connection conductors, said connection assembly comprising:

a receptacle means comprised of insulating material and surrounding an end portion of said flat ribbon cable, said receptacle means including a fixed support means against which extend uninsulated portions of said electrical conductors; and plug means comprising a plurality of spring contacts each attached to an end of one of said plurality of connection conductors, said plug means being insertable into said receptacle means with said spring contacts compressively engaging said uninsulated portions of said electrical conductors.

2. An apparatus in accordance with claim 1, wherein said receptacle means comprises a housing, and a first part and a second part each partially insertable into said housing, said first insertable part including said fixed support means and said second insertable part including an aperture for receiving said plug means.

3. An apparatus in accordance with claim 2, wherein said fixed support means comprises an elongated support portion of said first insertable part, said elongated support portion having said uninsulated portions of said electrical conductor extending longitudinally thereabout.

4. An apparatus in accordance with claim 3, wherein said elongated support portion includes a plurality of recesses at an end thereof for maintaining constant separation between said uninsulated portions of said electrical conductors.

5. An apparatus in accordance with claim 1, wherein said end portion of said flat ribbon cable has a strip of insulation at the end of said cable.

* * * * *